US006652408B2

United States Patent
Rutt et al.

(10) Patent No.: US 6,652,408 B2
(45) Date of Patent: Nov. 25, 2003

(54) VEHICULAR DIFFERENTIAL WITH RING GEAR DIRECTLY LOADING THE DIFFERENTIAL PIN

(75) Inventors: John E. Rutt, Macomb, MI (US); Brian C. Orr, Macomb, MI (US); Richard M. Krzesicki, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/014,394

(22) Filed: Dec. 11, 2001

(65) Prior Publication Data

US 2003/0109350 A1 Jun. 12, 2003

(51) Int. Cl.⁷ .............................................. F16H 48/06
(52) U.S. Cl. ........................ 475/230; 475/231; 475/336; 74/423
(58) Field of Search ................................ 475/230, 231, 475/336; 74/423; 403/315, 316, 317, 318, 319; F16H 48/08

(56) References Cited

U.S. PATENT DOCUMENTS

| | | | |
|---|---|---|---|
| 872,269 A | | 11/1907 | Williams |
| 1,115,536 A | * | 11/1914 | Hinkley ........................ 475/230 |
| 1,226,854 A | | 5/1917 | Bower |
| 1,279,670 A | | 9/1918 | Denning |
| 1,316,248 A | | 9/1919 | Latham |
| 1,502,529 A | | 7/1924 | Riedesel |
| 1,678,942 A | | 7/1928 | Holmes |
| 2,818,129 A | | 12/1957 | DeVere |
| 3,131,578 A | * | 5/1964 | Elliott ........................ 475/231 |
| 3,330,169 A | | 7/1967 | Carrico et al. |
| 3,606,406 A | * | 9/1971 | Walters ........................ 403/240 |
| 3,675,459 A | | 7/1972 | Dohmann |
| 3,741,343 A | | 6/1973 | Lindenfield et al. |
| 3,874,251 A | | 4/1975 | Lapitsky et al. |
| 3,894,447 A | * | 7/1975 | Michael ........................ 475/230 |
| 4,125,026 A | | 11/1978 | Torii et al. |
| 4,304,317 A | | 12/1981 | Vanzant et al. |
| 4,688,962 A | | 8/1987 | Koltookian |
| 4,722,244 A | | 2/1988 | Tsuchiya et al. |
| 4,754,661 A | | 7/1988 | Barnett |
| 4,796,488 A | | 1/1989 | Hagin et al. |
| 4,949,456 A | | 8/1990 | Kovach et al. |
| 5,098,355 A | * | 3/1992 | Long ........................ 475/220 |
| 5,453,030 A | | 9/1995 | Broussard |
| 5,480,360 A | * | 1/1996 | Patzer et al. ................. 475/230 |
| 5,520,589 A | | 5/1996 | Dewald et al. |
| 5,647,814 A | * | 7/1997 | Krisher ........................ 475/230 |
| 5,718,653 A | | 2/1998 | Showalter |
| 5,863,271 A | | 1/1999 | Schreier |
| 5,980,416 A | | 11/1999 | Gafvert |
| 6,010,424 A | | 1/2000 | Irwin |
| 6,056,663 A | * | 5/2000 | Fett ........................ 475/231 |
| 6,146,304 A | * | 11/2000 | Bendtsen .................... 475/230 |

FOREIGN PATENT DOCUMENTS

JP 09269043 * 10/1997

* cited by examiner

Primary Examiner—Rodney H. Bonck
Assistant Examiner—David D. Le
(74) Attorney, Agent, or Firm—Brinks Hofer Gilson & Lione

(57) ABSTRACT

A direct drive differential containing a ring gear and a differential pin attached directly to the ring gear. This arrangement changes the load path through the differential case that allows for a new design to be created. The ring gear has a slot and the differential pin has a flat on the sides that mate together when assembled. The differential pin is round and the ring gear has a radius that mate together when assembled. The ring gear has a diameter machined into the inside ring diameter but allows a pin with slots to be assembled. The pin locks into place in the ring gear by rotating the pin during assembly. The ring gear has a through hole or is drilled and tapped and the differential pin has a hole therefore the two parts can be locked together in place.

14 Claims, 3 Drawing Sheets

VEHICULAR DIFFERENTIAL WITH RING GEAR DIRECTLY LOADING THE DIFFERENTIAL PIN

BACKGROUND OF THE INVENTION

This invention relates to a motor vehicle drive train differential assembly and particularly to such an assembly in which the differential pin is directly attached to the differential ring gear.

Conventionally, motor vehicle differential gear assemblies transfer rotational torque from a driver member such as the output shaft of a gear transmission to a pair of driven axle shafts journaled for rotation and having the vehicle driven wheels mounted on their respective outboard ends.

U.S. Pat. Nos. 5,098,355 and 6,056,663 are illustrative of differential gear assemblies of this type. However, it has been found that it is desired to directly attach the differential pin to the hypoid differential ring gear.

BRIEF SUMMARY OF THE INVENTION

Accordingly, it is an object of this invention to provide a differential assembly wherein the differential pin is directly secured to the ring gear. This configuration is provided as a means of reducing the mass and complexity of the differential assembly.

Other general and more specific aspects will be set forth in the ensuing description and claims.

BRIEF DESCRIPTION OF THE DRAWINGS

The drawings that will now be briefly described are incorporated herein to illustrate preferred embodiment of the invention and a best mode presently contemplated for carrying out the invention.

DESCRIPTION OF PREFERRED EMBODIMENTS

Figure 1:
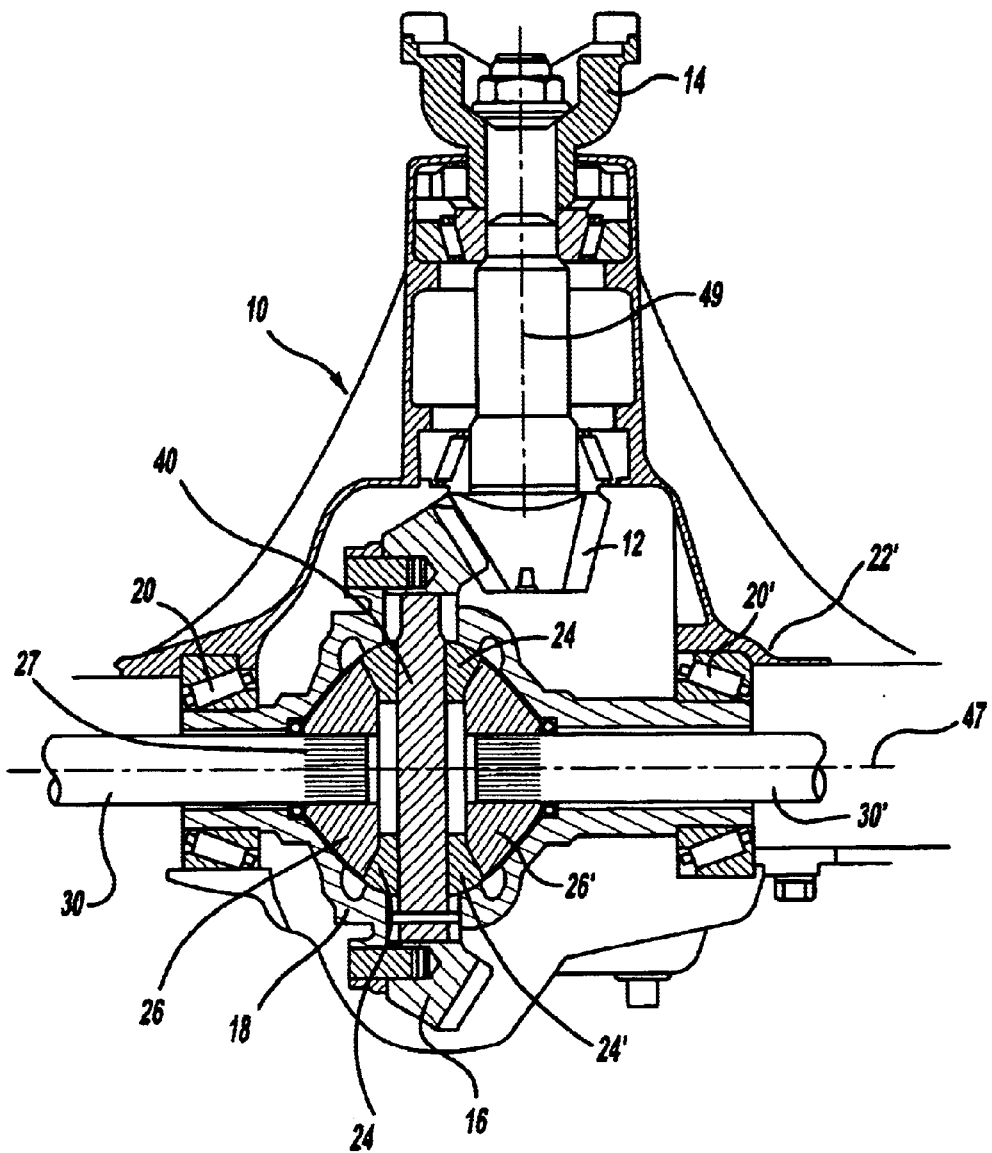
FIG. 1 is a cross-sectional view of an embodiment of a differential gear assembly of this invention.

The differential assembly 10 is operative to transfer rotary torque input through a hypoid pinion gear 12 driven by a rotary output shaft 14 of a gear transmission of the associated motor vehicle. Output shaft 14 includes a yoke that mounts a universal joint of a propeller shaft assembly. Hypoid pinion gear 12 has teeth that mesh with teeth on the hypoid ring gear 16. The ring gear 16 is secured to a carrier 18 that is journaled for rotation relative to case 22 by means of bearings 20 and 20'. As such, ring gear 16 and carrier 18 rotate coaxially about axle shafts 30 and 30' that have axle gears 26 and 26' secured to their inward ends by suitable means such as splines 27.

Axle shaft 30 is spaced apart from and substantially axially aligned with axle shaft 30' which has an axle gear 26 secured to its inboard end in facing relationship to axle gear 26'. Axle shafts 30 and 30' have a common central rotational axis 47 that is substantially perpendicular to central rotational axis 49 of hypoid pinion gear 12.

Each of differential pinion gears 24 and 24' are meshingly engaged with axle gears 26 and 26' that are rotatably mounted on carrier 18 by means of a differential pin 40. Rotation of carrier 18 by ring gear 16 causes differential pinion gears 24 and 24' to rotate about axis 47 and in turn cause axle gears 26 and 26' to rotate axle shafts 30 and 30' about the axis 47. In the event that axle shaft 30 rotates at a speed different than that of axle shaft 30', pinion gears 24 and 24' rotate about differential pin 40. Typically, such rotation is accommodated by suitable anti-friction bearings (not shown).

Figure 2:
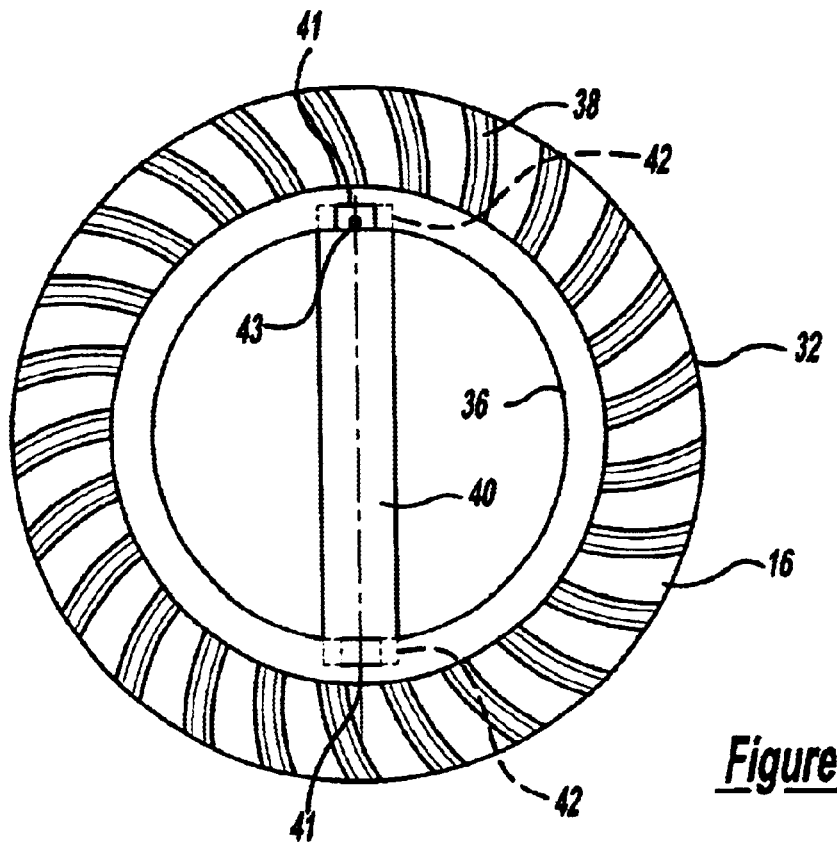
FIG. 2 is an enlarged view of the ring gear and the differential pin.

As can be seen with reference to FIG. 2, hypoid ring gear 16 has a generally annular configuration having a substantially circular outer surface 32 and a substantially circular inner surface 36. Ring gear 16 has a plurality of substantially evenly circumferentially spaced teeth 38 extending away from a side face of the ring gear between the outer surface 32 and the inner surface 36. Teeth 38 are preferably spiral bevel or hypoid type teeth having a curved tooth shape. The profile is shown in FIG. 2 and is provided to enhance smooth engagement with the teeth of hypoid pinion gear 12, which is also preferably provided with curved teeth for promoting smooth continuous mesh with teeth 38 of the ring gear 32. The use of spiral bevel or hypoid teeth shapes in vehicle differential gear assemblies to enhance smooth and vibration free transfer of torque is well known to those skilled in the art and is not therefore described here in detail.

Figure 3:
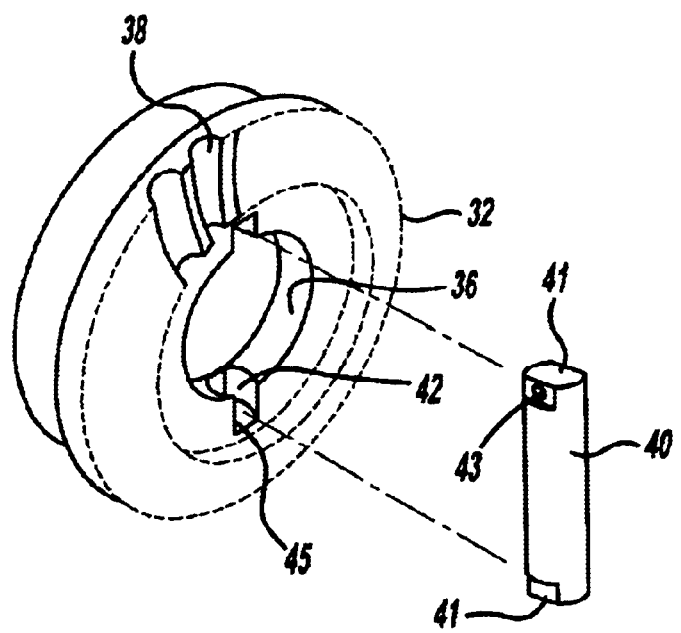
FIG. 3 is a perspective view of the ring gear and the differential pin preparatory to mounting the pin on the gear.
Figure 4:
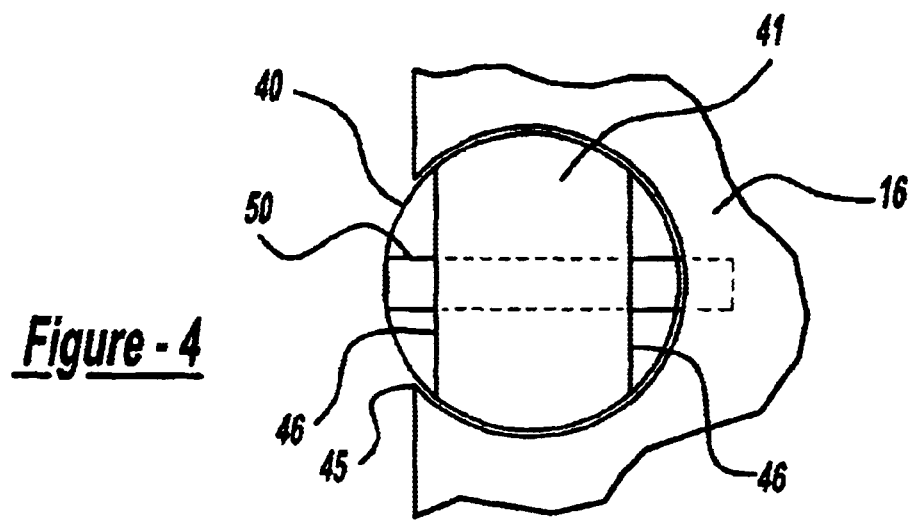
FIG. 4 is a fragmentary view of the pin and the ring gear with the pin in locked position.
Figure 5:
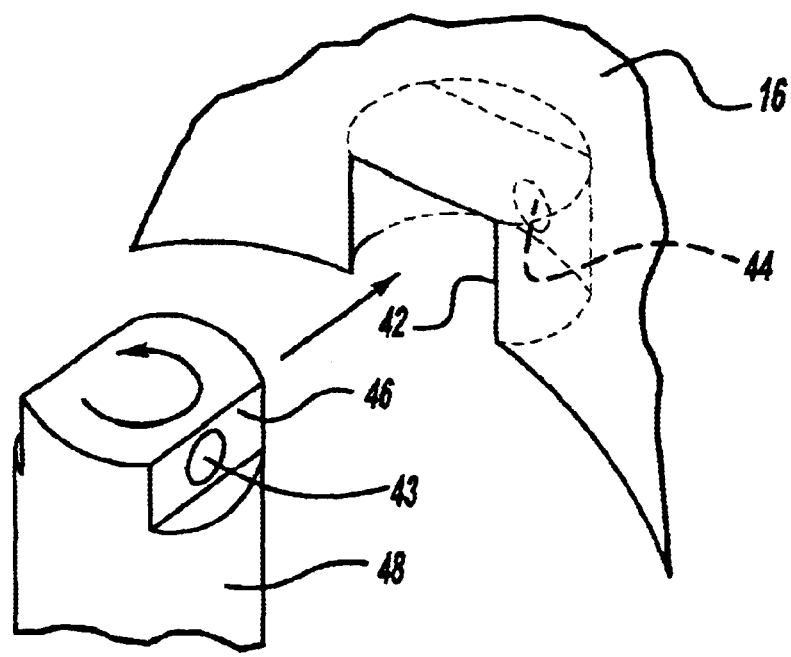
FIG. 5 is a perspective view showing the pin in a cavity in the ring gear.

FIG. 2 is a view of the ring gear 16 and the differential pin 40 that is fittingly received at its ends 41 in closed round cavities 42. The shape of cavities 42 is shown in FIGS. 3, 4 and 5 and form open slot 45. The pin 40 extends diametrically across the hypoid ring gear 16 and is locked in place in the cavities 42. A thru hole 43 is formed in the pin 40 50 the pin 40 can be locked to the ring gear 16 through installation of a retaining pin 50.

As shown in FIG. 3, the differential pin 40 is round except at its ends where parallel surfaces 46 are formed on opposite sides of the pin 40. As shown in FIG. 4, the pin 40 is, in cross-section, the same diameter as ring gear 16 cavities 42. The pin 40 is inserted in the slots 45 with the ends of the pin 40 rotated with the parallel surfaces 46 inserted within the slot 45 so that after insertion, the pin 40 can be rotated 90° to the position shown in FIG. 4 where it mechanically interlocks with ring gear 16. The retaining pin 50 retains pin 40 in the installed and interlocked position shown in FIG. 4. In order to provide the aforementioned engagement, the width of pin 40 measured between the surfaces 46 is less than the width of slot 45, and the full diameter of pin 40 is greater than the width of slot 45.

The foregoing discussion discloses and describes preferred embodiments of the invention. One skilled in the art will readily recognize from such discussion and from accompanying drawings and claims that change and modifications can be made to the invention without departing from the truth and fair scope of the invention as defined in the following claims. The invention has been described in an illustrative manner and it is to be understood that the terminology, which has been used, is intended to be in the nature of the words of description rather than of limitation.

We claim:

1. A motor vehicle differential assembly for transferring rotational torque input by a hypoid pinion gear rotatably driven by a driver member to a pair of substantially axially aligned rotary driven axle shafts that are journalled for rotation, the differential assembly of the type having a hypoid ring gear journalled for rotation concentrically with respect to the axle shafts and meshing with the hypoid pinion gear, and a pair of differential pinion gears rotatable with the ring gear and further meshing with an axle gear coupled to each of the axle shafts, said assembly comprising:

the hypoid ring gear having an inner surface and an outer surface and forming a pair of diametrically opposed cavities opening onto the inner surface;

a differential pin rotationally journalling the pair of differential pinion gears, the differential pin being secured to the hypoid ring gear and extending diametrically across the hypoid ring gear, the differential pin forming ends received by the cavities formed by the hypoid ring gear, each of the differential pin ends cooperating such that the ends may be installed within the cavities in one rotational orientation of the differential pin and the ends become interlocked with the cavities when the differential pin is rotated in place to a second rotational orientation within the cavities.

2. The assembly of claim 1 wherein the hypoid ring gear cavities are generally circular and have slots opening laterally to receive the differential pin ends.

3. The assembly of claim 2 wherein the differential pin is an elongated cylinder and the differential pin ends form parallel side surfaces, with the surfaces separated by a width less than the width of the slots and the diameter of the differential pin is greater than the width of the slots.

4. The assembly of claim 2 wherein the differential pin further forms a retaining pin through hole and a retaining pin installed through the retaining pin through hole prevents the differential pin from rotating from the second rotational orientation.

5. The assembly of claim 4 wherein the ring gear further forms a ring gear through hole and the retaining pin is installed through the retaining pin through hole and the ring gear through hole to prevent the differential pin from rotating from the second rotational orientation.

6. A motor vehicle differential assembly for transferring rotational torque input by a hypoid pinion gear rotatably driven by a driver member to a pair of substantially axially aligned rotary driven axle shafts that are journalled for rotation, the differential assembly of the type having a hypoid ring gear journalled for rotation concentrically with respect to the axle shafts and meshing with the hypoid pinion gear, and a pair of differential pinion gears rotatable with the ring gear and further meshing with an axle gear coupled to each of the axle shafts, the assembly comprising:

the hypoid ring gear having an inner surface and an outer surface and forming a pair of diametrically opposed cavities opening onto the inner surface and having a generally cylindrical shape and forming a slot opening to a lateral side of the ring gear;

a differential pin rotationally journalling the pair of differential pinion gears, the differential pin being secured to the hypoid ring gear and extending diametrically across the hypoid ring gear, the differential pin forming ends received by the cavities formed by the hypoid ring gear, each of the differential pin ends cooperating such that the ends may be installed within the cavities in one rotational orientation of the differential pin and the ends become interlocked with the cavities when the differential pin is rotated in place to a second rotational orientation within the cavities.

7. The assembly of claim 6 wherein the differential pin is an elongated cylinder and the differential pin ends form parallel side surfaces, with the surfaces separated by a width less than the width of the slots and the diameter of the pin is greater than the width of the slots.

8. The assembly of claim 6 wherein the differential pin further forms a retaining pin through hole and a retaining pin installed through the retaining pin through hole prevents the differential pin from rotating from the second rotational orientation.

9. The assembly of claim 6 wherein the ring gear further forms a ring gear through hole and the retaining pin is installed through the retaining pin through hole and the ring gear through hole to prevent the differential pin from rotating from the second rotational orientation.

10. A motor vehicle differential assembly for transferring rotational torque input by a hypoid pinion gear rotatably driven by a driver member to a pair of substantially axially aligned rotary driven axle shafts that are journalled for rotation, the differential assembly of the type having a hypoid ring gear journalled for rotation concentrically with respect to the axle shafts and meshing with the hypoid pinion gear, and a pair of differential pinion gears rotatable with the ring gear and further meshing with an axle gear coupled to each of the axle shafts, the axle gears and the pinion gears being supported by a differential case housing, said assembly comprising:

the hypoid ring gear having an inner surface and an outer surface and forming a pair of diametrically opposed cavities opening onto the inner surface;

a differential pin rotationally journalling the pair of differential pinion gears, the differential pin being secured to the hypoid ring gear and extending diametrically across the hypoid ring gear, the differential pin forming ends received by the cavities formed by the hypoid ring gear, each of the differential pin ends cooperating such that the ends may be installed within the cavities in one rotational orientation of the differential pin and the ends become interlocked with the cavities when the differential pin is rotated in place to a second rotational orientation.

11. The assembly of claim 10 wherein the hypoid ring gear cavities are generally circular and have slots opening laterally to receive the differential pin ends.

12. The assembly of claim 11 wherein the differential pin is an elongated cylinder and the differential pin ends form parallel side surfaces, with the surfaces separated by a width less than the width of the slots and the diameter of the differential pin is greater than the width of the slots.

13. The assembly of claim 11 wherein the differential pin further forms a retaining pin through hole and a retaining pin installed through the retaining pin through hole prevents the differential pin from rotating from the second rotational orientation.

14. The assembly of claim 13 wherein the ring gear further forms a ring gear through hole and the retaining pin is installed through the retaining pin through hole and the ring gear through hole to prevent the differential pin from rotating from the second rotational orientation.

* * * * *

UNITED STATES PATENT AND TRADEMARK OFFICE
CERTIFICATE OF CORRECTION

PATENT NO.    : 6,652,408 B2
DATED         : November 25, 2003
INVENTOR(S)   : John E. Rutt et al.

It is certified that error appears in the above-identified patent and that said Letters Patent is hereby corrected as shown below:

<u>Title page</u>,
Item [56], References Cited, U.S. PATENT DOCUMENTS, delete "Lindenfield" and substitute -- Lindenfeld -- in its place.

Signed and Sealed this

Sixth Day of April, 2004

JON W. DUDAS
*Acting Director of the United States Patent and Trademark Office*